United States Patent
Johnson et al.

(10) Patent No.: US 10,337,341 B2
(45) Date of Patent: Jul. 2, 2019

(54) ADDITIVELY MANUFACTURED AUGMENTOR VANE OF A GAS TURBINE ENGINE WITH ADDITIVELY MANUFACTURED FUEL LINE EXTENDING THERETHROUGH

(71) Applicant: United Technologies Corporation, Farmington, CT (US)

(72) Inventors: Javier N. Johnson, East Hardford, CT (US); Chris Bates, Jupiter, FL (US); Eric Beach, Coventry, CT (US); Jorge I. Farah, Hartford, CT (US); Caleb N. Cross, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 225 days.

(21) Appl. No.: 15/292,835

(22) Filed: Oct. 13, 2016

(65) Prior Publication Data
US 2018/0030842 A1    Feb. 1, 2018

Related U.S. Application Data

(63) Continuation-in-part of application No. 15/224,935, filed on Aug. 1, 2016.

(51) Int. Cl.
    *F23R 3/20*      (2006.01)
    *F01D 9/04*      (2006.01)
    *F02C 7/22*      (2006.01)

(52) U.S. Cl.
CPC .............. *F01D 9/041* (2013.01); *F02C 7/222* (2013.01); *F23R 3/20* (2013.01); *F05D 2220/323* (2013.01)

(58) Field of Classification Search
CPC .... F23R 3/20; F23R 3/18; F23R 3/283; F23R 2900/00004; F23R 2900/00017; F23R 2900/00018; B33Y 10/00; B33Y 80/00; F01D 5/185; F01D 9/041; F01D 9/06; F01D 9/065; F01D 25/305; F02K 3/10; F02K 3/08; F02K 3/105; F02K 3/11; F02K 1/17; F05D 2220/32; F05D 2220/323;
(Continued)

(56) References Cited

U.S. PATENT DOCUMENTS

| 4,887,425 A | 12/1989 | Vdoviak |
| 5,243,759 A | 9/1993 | Brown |

(Continued)

FOREIGN PATENT DOCUMENTS

| EP | 1847684 A1 | 10/2007 |
| EP | 2743451 A1 | 6/2014 |

(Continued)

OTHER PUBLICATIONS

U.S. Office Action dated May 1, 2018 for corresponding U.S. Appl. No. 15/224,935.

(Continued)

*Primary Examiner* — Jason H Duger
(74) *Attorney, Agent, or Firm* — Bachman & LaPointe, P.C.

(57) ABSTRACT

An augmentor vane assembly includes an additively manufactured augmentor vane and a fuel line additively manufactured within the augmentor vane. A method of manufacture including additively manufacturing an augmentor vane having a wall that forms an internal volume therein; and additively manufacturing a fuel line within the augmentor vane that extends through the internal volume.

14 Claims, 7 Drawing Sheets

(58) Field of Classification Search
CPC .............. F05D 2230/12; F05D 2230/20; F05D 2230/22; F05D 2230/31; F05D 2230/53; F05D 2240/12; F05D 2260/20; F05D 2260/232; F05D 2300/17; F05D 2230/10; F05D 2230/11; F05D 2230/13; F05D 2230/14; F05D 2230/30; F05D 2230/311; F05D 2230/312; F05D 2230/313; F05D 2230/314; F05D 2240/122; F02C 7/222; F01N 3/26; F01N 3/36

See application file for complete search history.

(56) References Cited

U.S. PATENT DOCUMENTS

| | | | |
|---|---|---|---|
| 6,125,627 A | 10/2000 | Rice et al. | |
| 6,668,541 B2 | 12/2003 | Rice et al. | |
| 6,895,756 B2 | 5/2005 | Schmotolocha et al. | |
| 7,117,839 B2 | 10/2006 | Horstin | |
| 7,137,255 B2 | 11/2006 | Schmotolocha et al. | |
| 7,424,805 B2 | 9/2008 | Johnson | |
| 7,448,199 B2 | 11/2008 | Johnson | |
| 7,475,545 B2 | 1/2009 | Johnson | |
| 7,481,059 B2 | 1/2009 | Andersson et al. | |
| 7,509,797 B2 | 3/2009 | Johnson | |
| 7,565,804 B1 | 7/2009 | Frash et al. | |
| 7,581,398 B2 | 9/2009 | Mayer et al. | |
| 7,730,714 B2 | 6/2010 | Wood et al. | |
| 7,762,077 B2 | 7/2010 | Pederson et al. | |
| 7,908,868 B2 | 3/2011 | Bunel et al. | |
| 7,997,080 B2 | 8/2011 | Harmon, Sr. et al. | |
| 8,092,175 B2 | 1/2012 | Beeck et al. | |
| 2002/0124615 A1 | 9/2002 | Beeck et al. | |
| 2014/0205454 A1 | 7/2014 | Giovannetti et al. | |
| 2015/0144496 A1 | 5/2015 | Morris et al. | |
| 2016/0208648 A1 | 7/2016 | Farah | |

FOREIGN PATENT DOCUMENTS

| | | |
|---|---|---|
| GB | 759251 A | 10/1956 |
| WO | 2016198210 A1 | 12/2016 |

OTHER PUBLICATIONS

European Search Report dated Apr. 12, 2018 for corresponding European Patent Application 17184335.2.
European Search Report dated Dec. 19, 2017 for corresponding European Patent Application 17184335.2.

US 10,337,341 B2

ADDITIVELY MANUFACTURED AUGMENTOR VANE OF A GAS TURBINE ENGINE WITH ADDITIVELY MANUFACTURED FUEL LINE EXTENDING THERETHROUGH

CROSS-REFERENCE TO RELATED APPLICATIONS

The present disclosure is a CONTINUATION-IN-PART to U.S. patent application Ser. No. 15/224,935 filed Aug. 1, 2016.

BACKGROUND

The present disclosure relates generally to a component with integral passages and more specifically to an additive manufactured component.

Many aerospace components such as struts, supports, leading edge and trailing edge components form enclosures with apertures therethrough for communication of fluids such as air or fuel. In scenarios where fuel is injected into airflow from an aerospace component, legacy designs typically involve a fuel tube inserted into the aerospace component. Relatively large racetrack orifices and seals are utilized to account for thermal growth differentials between the fuel tubes and vane walls. These orifices expose seals to high temperatures that require relatively high cost seals.

SUMMARY

An aerospace component according to one disclosed non-limiting embodiment of the present disclosure can include an augmentor vane; and a fuel line additively manufactured within the augmentor vane.

A further embodiment of the present disclosure may include that the augmentor vane is additively manufactured.

A further embodiment of the present disclosure may include that the component is an augmentor vane.

A further embodiment of the present disclosure may include that the fuel line is formed through an endwall.

A further embodiment of the present disclosure may include that the fuel line is spaced from the endwall.

A further embodiment of the present disclosure may include that the fuel line includes a branch that extends about 40 degrees from a central line.

A further embodiment of the present disclosure may include that the fuel line includes a branch that extends at greater than about 40 degrees from a central line.

A further embodiment of the present disclosure may include that the fuel line terminates at an exit aperture through a wall of the augmentor vane.

A further embodiment of the present disclosure may include that the wall of the augmentor vane is airfoil shaped.

A further embodiment of the present disclosure may include that the fuel line terminates at an exit aperture that defines an internal radius.

A further embodiment of the present disclosure may include wherein the fuel line terminates at an exit aperture that is seal less.

An augmentor vane according to one disclosed non-limiting embodiment of the present disclosure can include an additively manufactured augmentor vane wall that forms an internal volume therein; and a fuel line additvely manufactured within the augmentor vane and extends through the internal volume, the fuel line terminates at an exit aperture that is seal less.

A further embodiment of the present disclosure may include that the fuel line includes a branch that extends at greater than about 40 degrees from a central line.

A further embodiment of the present disclosure may include that the wall of the augmentor vane is airfoil shaped.

A further embodiment of the present disclosure may include that the fuel line terminates at an exit aperture that defines an internal radius.

A method of manufacture according to one disclosed non-limiting embodiment of the present disclosure can include additively manufacturing an augmentor vane wall that forms an internal volume therein; and additively manufacturing a fuel line within the augmentor vane extends through the internal volume.

A further embodiment of the present disclosure may include additively manufacturing the fuel line with a branch that extends at greater than about 40 degrees from a central line.

A further embodiment of the present disclosure may include additively manufacturing the fuel line such that the fuel line terminates transverse through the augmentor vane wall.

A further embodiment of the present disclosure may include additively manufacturing the fuel line such that the fuel line terminates at an exit aperture that defines an internal radius.

A further embodiment of the present disclosure may include additively manufacturing the fuel line such that the fuel line is spaced from the endwall.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
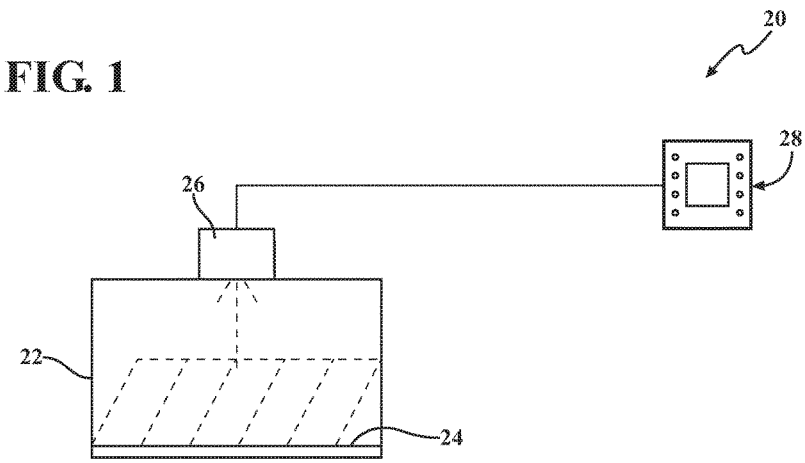
FIG. 1 is a general schematic view of an additive manufacturing system.

FIG. 1 schematically illustrates an additive manufacturing system 20. The system 20 generally includes a build chamber 22 with a powder bed 24, one or more energy sources 26 such as a laser and a control 28 (all illustrated schematically). It should be appreciated that as defined herein, "additive manufacturing" processes include, but are not limited to, selective laser melting (SLM), Direct Metal Laser Sintering (DMLS), Powder-Bed Electron Beam Melting (EBM), Electron Beam Free Form Fabrication (EBF3), Laser Engineered Net Shape (LENS) and others. Although particular additive manufacturing processes are disclosed, those skilled in the art of manufacturing will recognize that any other suitable rapid manufacturing methods using layer-by-layer construction or additive fabrication can alternatively be used.

The additive manufacturing process sequentially builds-up layers of atomized alloy and/or ceramic powder material that include but are not limited to, steel alloys, stainless steel alloys, titanium alloys, nickel alloys, aluminum alloys and others in atomized powder material form. Nickel alloys may have specific benefit for parts that operate in high temperature environments, such as, for example, environments typically encountered by aerospace and gas turbine engine components.

The additive manufacturing process fabricates or "grows" components using three-dimensional information, for example a three-dimensional computer model. The three-dimensional information is converted into a plurality of slices, each slice defining a cross section of the component for a predetermined height of the slice. The additive manufactured component is essentially "grown" slice-by-slice, or layer-by-layer, until finished. Each layer has an example size between about 0.0005-0.001 inches (0.0127-0.0254 mm). The additive manufacturing process facilitates manufacture of the relatively complex internal passage geometry to minimize assembly details, gun-drilling, and multi-component construction.

Figure 2:
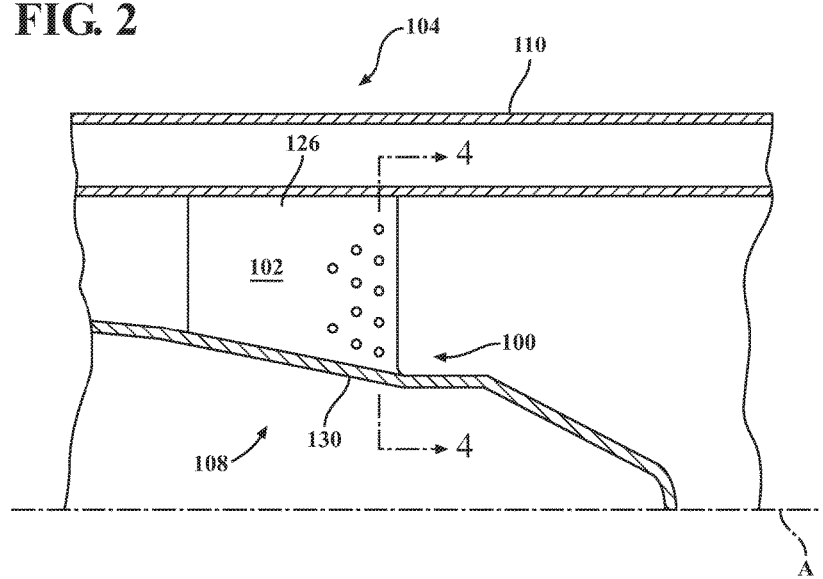
FIG. 2 is an expanded sectional view of an augmentor vane of the augmentor section.
Figure 3:
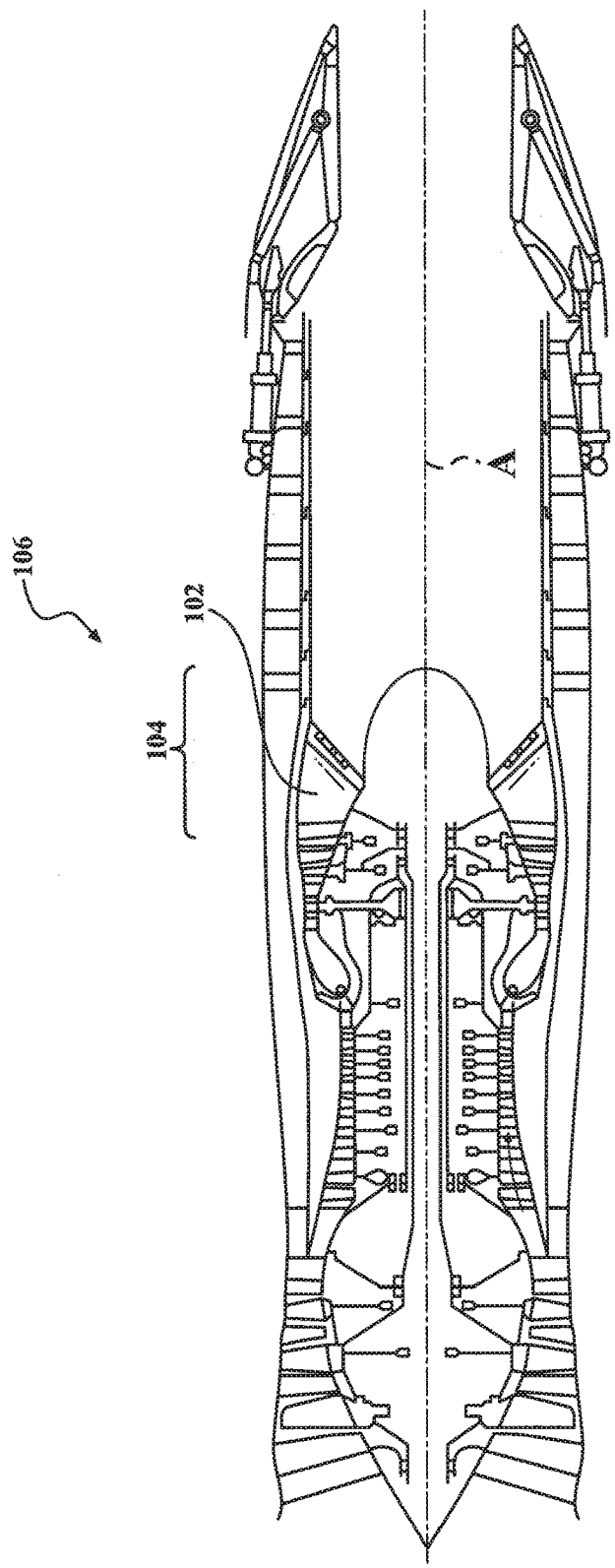
FIG. 3 is a general schematic view of an exemplary gas turbine engine embodiment for use with the augmentor vane of FIG. 2.

With reference to FIG. 2, one example aerospace component 100 is a trailing edge of an augmentor vane 102 in, for example, an augmenter section 104, turbine, or other section of a gas turbine engine 106 (illustrated schematically in FIG. 3). Although illustrated as an augmentor vane, other components that are attached to engine inlet sections, fan stators, compressor stators, guide vanes, intermediate cases, mid-turbine frames, turbine exhaust cases, augmentor, exhaust mixers and many others that may include thin walls that contain conduit or other flow passages will also benefit herefrom.

The example augmentor vanes 102 are circumferentially arrayed and are fastened radially between a center body 108, and a turbine exhaust case (TEC) 110. Each vane 102 may be generally airfoil shaped. Due in part to the harsh environment, the strict alignment requirements, the relatively thin walls, the relatively complex internal fuel conduit structures and the requirement for numerous cooling and fuel apertures therethrough, the example aerospace component 100—and many others—may be manufactured via an additive manufacturing processes.

Figure 4:
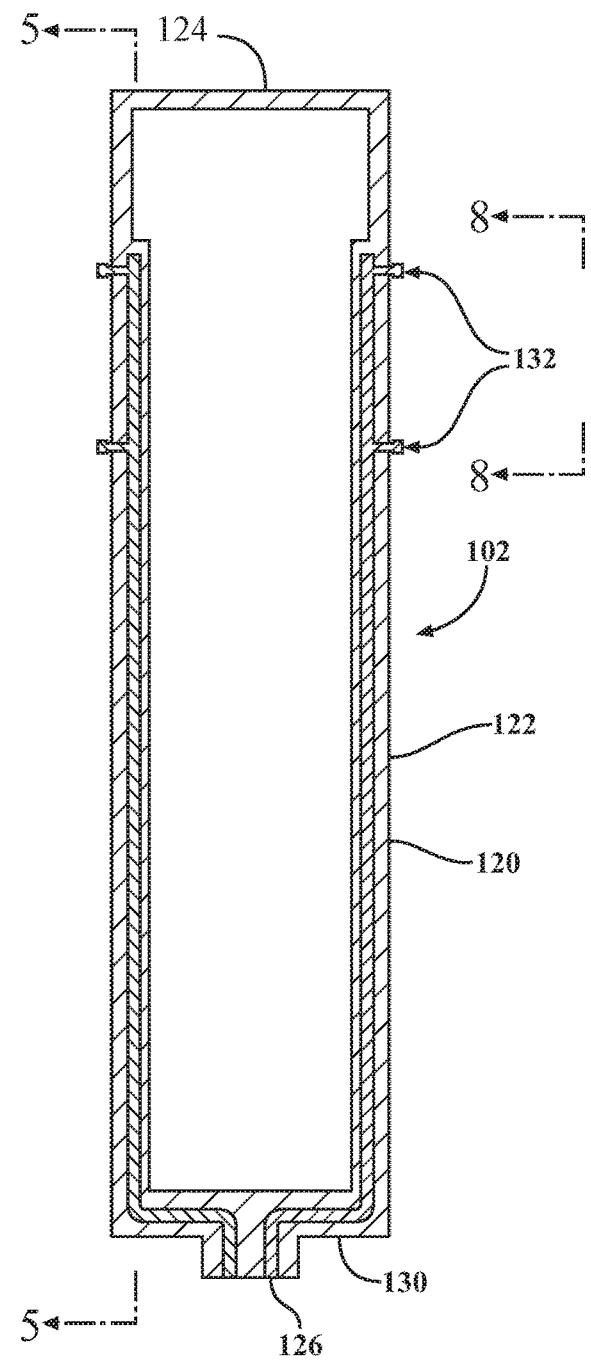
FIG. 4 is a sectional view of an example augmentor vane taken along line 4-4 in FIG. 2.

With reference to FIG. 4, the example augmentor vane 102 includes an integral longitudinal wall passage 120 formed within the vane wall 122. In this example, the integral longitudinal wall passage 120 is a fuel passage that is additively manufactured into the vane wall 122 generally from a radial inboard end wall 130 adjacent to the center body 108 (FIG. 3) toward an end wall adjacent to the TEC 110 (FIG. 3). That is, the integral longitudinal wall passage 120 longitudinally extends within the vane wall 122 and may form a thickened area therein.

Figure 5:
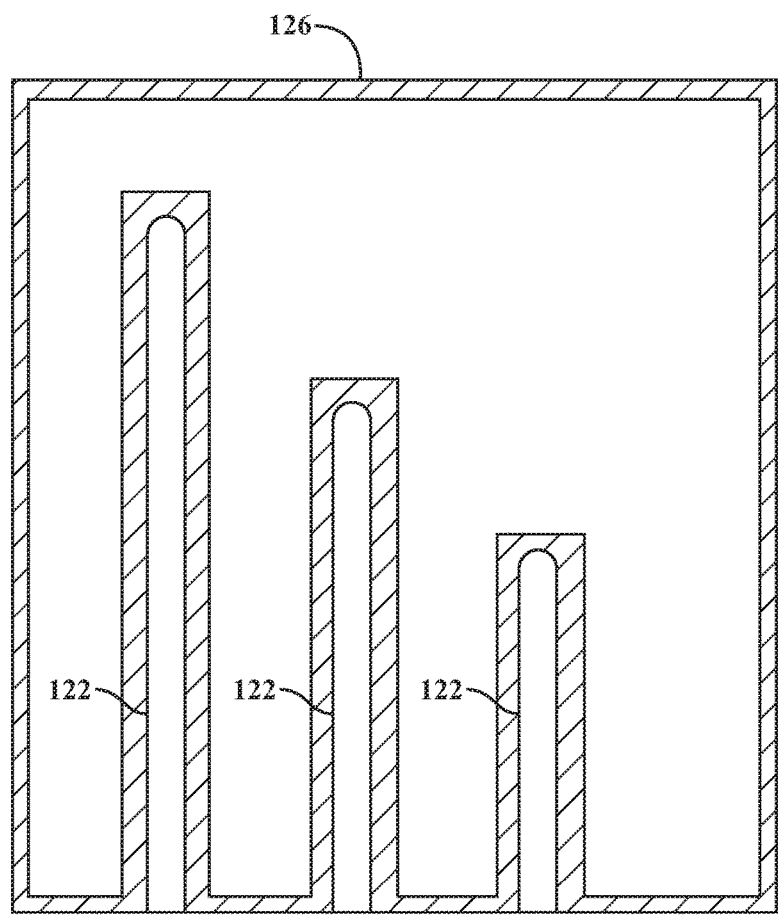
FIG. 5 is a sectional view of an example augmentor vane taken along line 5-5 in FIG. 4.

Additive manufacturing facilitates manufacture of the integral longitudinal wall passage 120 that need not longitudinally extend to an end wall 124 (FIG. 5) to reduce coking and thermal stresses by removing unbeneficial material. That is, a drilled passage would necessarily be required to extend between the end walls 124, 130. Alternatively, this design can be produced via casting or conventional machining methods if the integral longitudinal wall passage 120 extends between the end walls 124, 130 such that integral longitudinal wall passage 120 can then be cross-drilled and plug welded closed.

Figure 8:
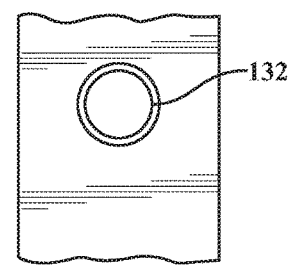
FIG. 8 is a face view of an aperture of the augmentor vane of FIG. 4.

The integral longitudinal wall passage 120 includes an entrance aperture 126, typically through a radially inboard or outboard end wall 130 transverse to the vane wall 122, and a multiple of exit apertures 132 (FIG. 8) that extend through the vane wall 122. The multiple of exit apertures 132 are generally transverse to the integral longitudinal wall passage 120 and may be shaped or otherwise configured to facilitate a desired fuel spray.

In one embodiment, the entrance aperture 126 and multiple of exit apertures 132 are additively manufactured undersized then final machined to provide a desired flow rate. The final machine operation may include Electron Discharge Machining (EDM) to avoid machining chips becoming trapped therein. The integral longitudinal wall passage 120 can alternatively or additionally be flowed with abrasive media to improve internal surface finish.

The entrance aperture 126 and multiple of exit apertures 132 provide the secondary purpose for the removal of residual powder from the additively manufacturing process. Alternatively, if produced via casting, a similar methodology can be applied for removal of the casting wax as opposed to DMLS powder. Alternatively, if produced from conventional machining, cross-drilling and plug welding removes concerns with internal fuel passage finish.

The integral production of the entrance apertures 126 and the multiple of exit aperture 132 (FIG. 8) readily facilitates the reshaping and/or relocation thereof. For example, improperly formed apertures may be plug welded and re-drilled.

Figure 6:
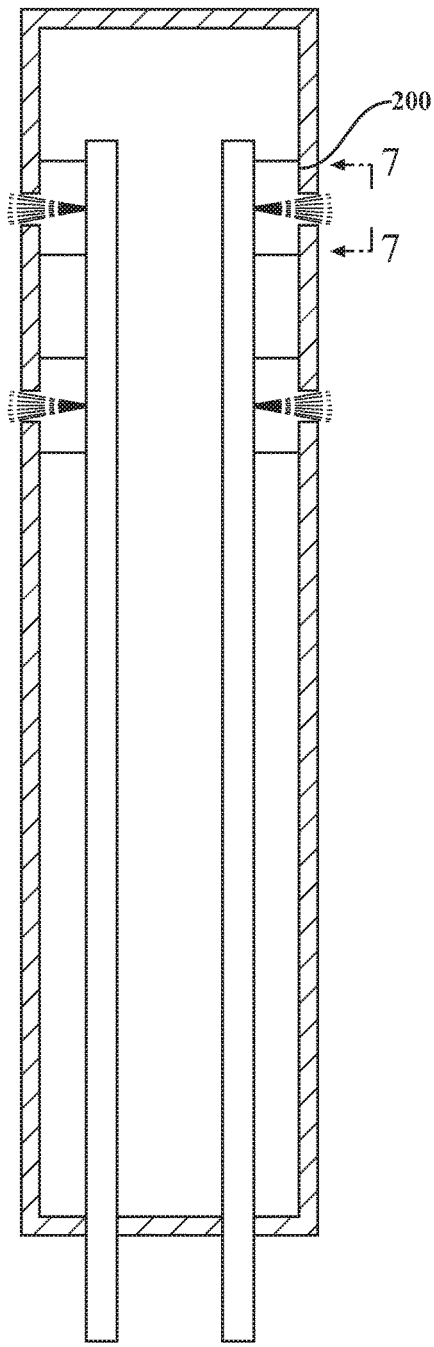
FIG. 6 is a sectional view of a RELATED ART augmentor vane taken along line 4-4 in FIG. 2.
Figure 7:
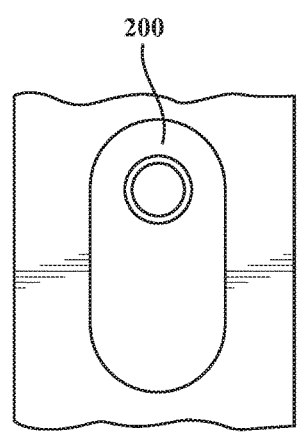
FIG. 7 is a face view of a RELATED ART aperture of the RELATED ART augmentor vane of FIG. 6.

The multiple of exit apertures 132, being drilled, additively manufactured, or otherwise directly formed in the vane 102, obviates the heretofore need for large racetrack orifices (FIGS. 6 and 7; RELATED ART) that are utilized to account for thermal growth differentials between fuel tubes and vane walls. That is, the seals can be eliminated and the fuel conduits combined integrally with the "strut-vane" part.

The integral longitudinal wall passages 120 expands the volume within the vane to increase cooling area or allow vane width to shrink which thereby reduces core flow blockage through vanes and reduces cooling air allocation. The integral longitudinal wall passages 120 reduces part count by not requiring separate fuel tubes and seals; reduces assembly/disassembly complexity through part count reduction; simplifies design resulting in reduced design and fabrication lead time; allows reshaping/relocation of holes anywhere along the vane wall in line with fuel lines; allows increases vane internal area for cooling air and/or allows vane width to decrease thereby reducing core flow blockage through vane pack; eliminates concern of fuel eclipsing in between fuel tube and vane walls; eliminated concern of fuel leakage into internal vane cavity; eliminates need for elliptical shaped holes in vane to account for thermal growth differential between fuel tubes and vane. Holes can now be designed to optimal shape; allows fuel to cool vane walls further reducing cooling air allocation required; facilitates repairable or rework-able; and fuel post height can be tailored to minimize non-wetted areas to prevent coking.

Figure 9:
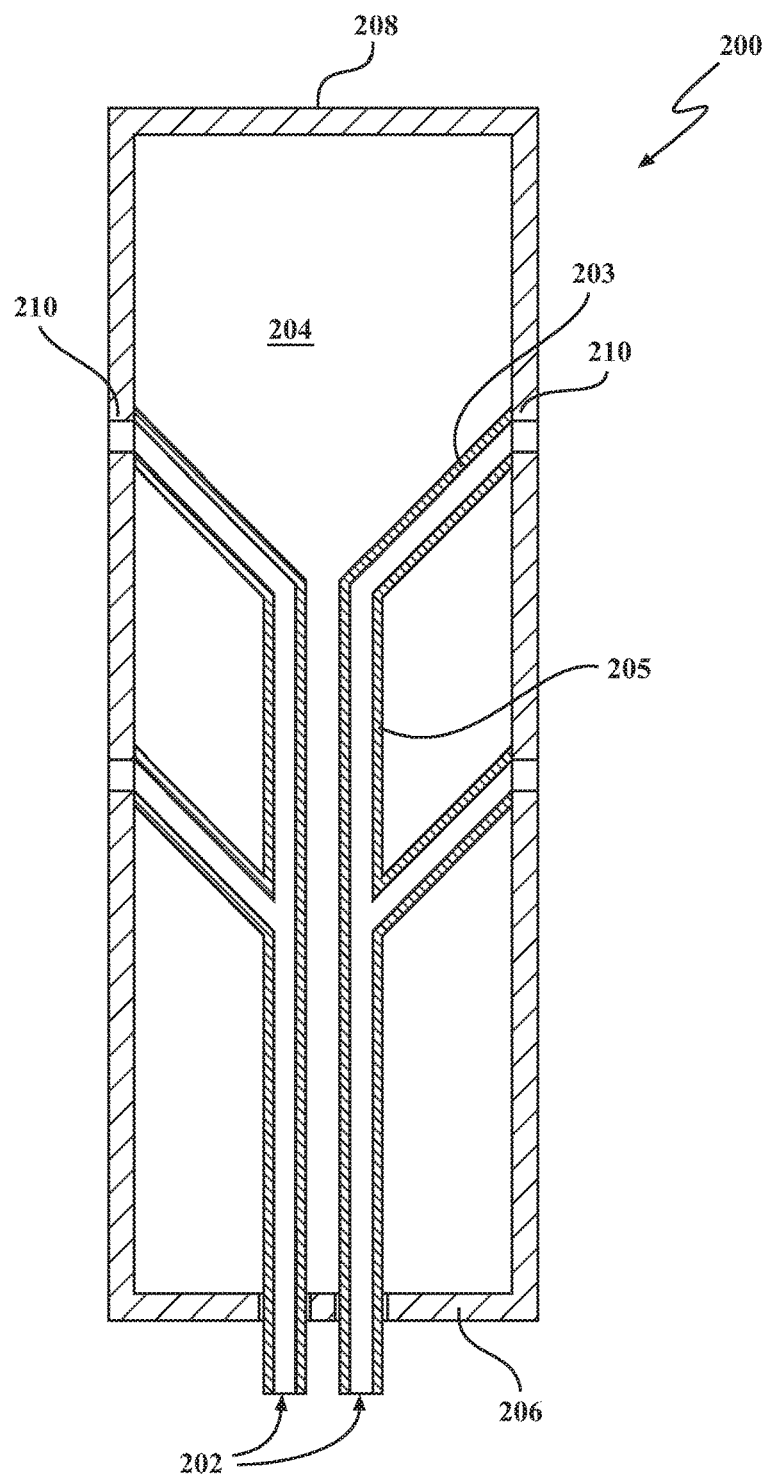
FIG. 9 is a sectional view of an augmentor vane of the augmentor section according to another embodiment.

With reference to FIG. 9, in another embodiment, an augmentor vane 200 includes a multiple of fuel lines 202 that are additively manufactured therein. The augmentor vane 200 may be additively manufactured of the same or different material than that of the multiple of fuel lines 202. Since the fuel lines 202 are additively manufactured within the vane 200, cooling air that is communicated through a volume 204 defined within the vane 200 minimizes fuel coking of the fuel lines 202. That is, the multiple of fuel lines 202 are integrally formed into the vane 200 which permits increased cooling airflow through the vane 200.

As the fuel lines 202 are additively manufactured into the augmentor vane 200, the fuel lines 202 do not need to be straight and can include bends or other geometry to permit flexibility for thermal growth and vibrational/engine loading differences. The integral formation of the fuel lines 202 via additive manufacturing also expand the volume 204 within the vane 200 to increase cooling area, or permit a cross-sectional redaction of the vane with to reduce core flow blockage and reduce cooling air allocation. In this embodiment, at least one of the multiple of fuel lines 202 may include a branch 203 and a main line 205. The branch 203, in this embodiment, is defined at, for example, an at least 40° or greater angle with respect to the main line 205 to facilitate the additively manufactured build processes.

Figure 10:
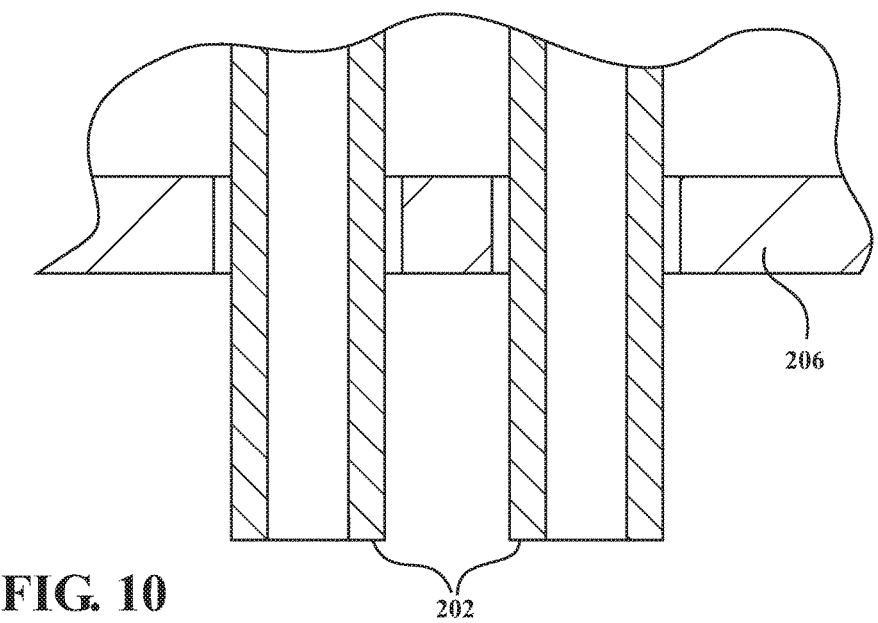
FIG. 10 is an expanded sectional view of an inlet to a fuel line into the augmentor vane.

The fuel lines 202, in this embodiment, enter from an inner end wall 206 (shown) and/or an outer end wall 208 to accommodate various augmentor fuel manifold locations. The fuel lines 202 may also be connected to the inner end wall 206 or spaced therefrom (FIG. 10) to accommodate thermal growth and/or differences in vibrational/engine loading.

Figure 11:
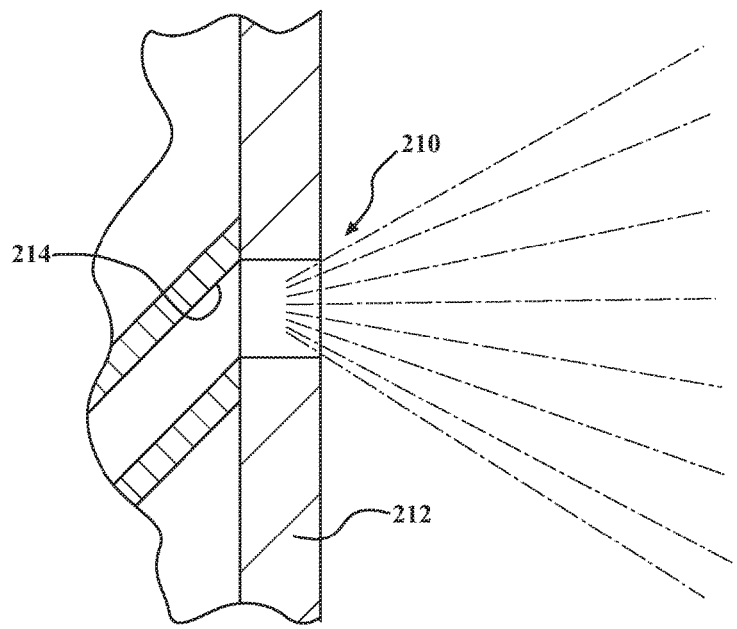
FIG. 11 is an expanded sectional view of an exit to a fuel line from the augmentor vane.

The fuel lines 202 terminate at exit apertures 210 (FIG. 11) that extend through the vane wall 212. The exit apertures 210 are generally transverse to the vane wall 212 and may be shaped or otherwise configured to facilitate a desired fuel spray. The fuel lines 202 include inner radiuses 214 that facilitate fuel flow to flow out more fluidly. These inner radiuses cannot be otherwise manufactured than via additive manufacturing such as via casting.

The use of the terms "a" and "an" and "the" and similar references in the context of the description herein (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the structural member and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that the steps of the sequences and methods described herein may be performed in any order, separated or combined unless otherwise indicated and will still benefit from the present disclosure.

The foregoing description is exemplary rather than defined by the limitations within. Various non-limiting embodiments are disclosed herein. However, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. An augmentor vane assembly of a gas turbine engine, comprising:
    an additively manufactured augmentor vane that includes a vertical wall extending perpendicular with and radially between a radially inboard endwall and a radially outboard endwall to define therein an internal volume containing cooling air within the augmentor vane; and
    an additively manufactured fuel line extending through the radially inboard endwall and through the internal volume, the additively manufactured fuel line comprising a main line extending parallel to the vertical wall within the internal volume and multiple branch lines within the internal volume that each branch off from the main line extending radially outward and toward the vertical wall at an oblique angle to the main line,
    each respective one of the multiple branch lines having a radially outboard end and terminating inside the vertical wall at the radially outboard end, each radially outboard end including an outlet adjacent a respective exit aperture formed through the vertical wall.

2. The augmentor vane assembly as recited in claim 1, wherein the main line extends through the radially inboard endwall.

3. The augmentor vane as recited in claim 2, wherein the radially inboard endwall is adjacent to a center body within a turbine exhaust case of the gas turbine engine.

4. The augmentor vane assembly as recited in claim 2, wherein the main line is spaced from the radially inboard endwall.

5. The augmentor vane assembly as recited in claim 4, wherein the oblique angle is equal to 40 degrees.

6. The augmentor vane assembly as recited in claim 4, wherein the oblique angle is greater or equal to 40 degrees.

7. The augmentor vane assembly as recited in claim 1, wherein each respective exit aperture is transverse to the vertical wall.

8. The augmentor vane assembly as recited in claim 7, wherein the vertical wall of the augmentor vane is airfoil shaped and surrounds the main line.

9. The augmentor vane assembly as recited in claim 7, wherein for each respective one of the multiple branch lines no seal is provided between the radially outboard end and the respective exit aperture.

10. A method of manufacturing an augmentor vane assembly of a gas turbine engine, comprising:
additively manufacturing an augmentor vane that includes a vertical wall extending perpendicular with and radially between a radially inboard endwall and a radially outboard endwall to define an internal volume containing cooling air within the augmentor vane; and
additively manufacturing a fuel line extending through the radially inboard endwall and through the internal volume, the fuel line comprising a main line extending parallel to the vertical wall within the internal volume and multiple branch lines within the internal volume that each branch off from the main line extending radially outward and toward the vertical wall at an oblique angle to the main line, each respective one of the multiple branch lines having a radially outboard end and terminating inside the vertical wall at the radially outboard end, each radially outboard end including an outlet adjacent a respective exit aperture formed through the vertical wall.

11. The method as recited in claim 10, wherein the oblique angle is greater or equal to 40 degrees.

12. The method as recited in claim 10, wherein the main line extends through the radially inboard endwall.

13. The method as recited in claim 12, further comprising additively manufacturing the augmentor vane such that each respective exit aperture is transverse to the vertical wall.

14. The method as recited in claim 10, further comprising additively manufacturing the fuel line such that the main line extends through and is spaced from the radially inboard endwall.

* * * * *